Figures 1, 2, 3:
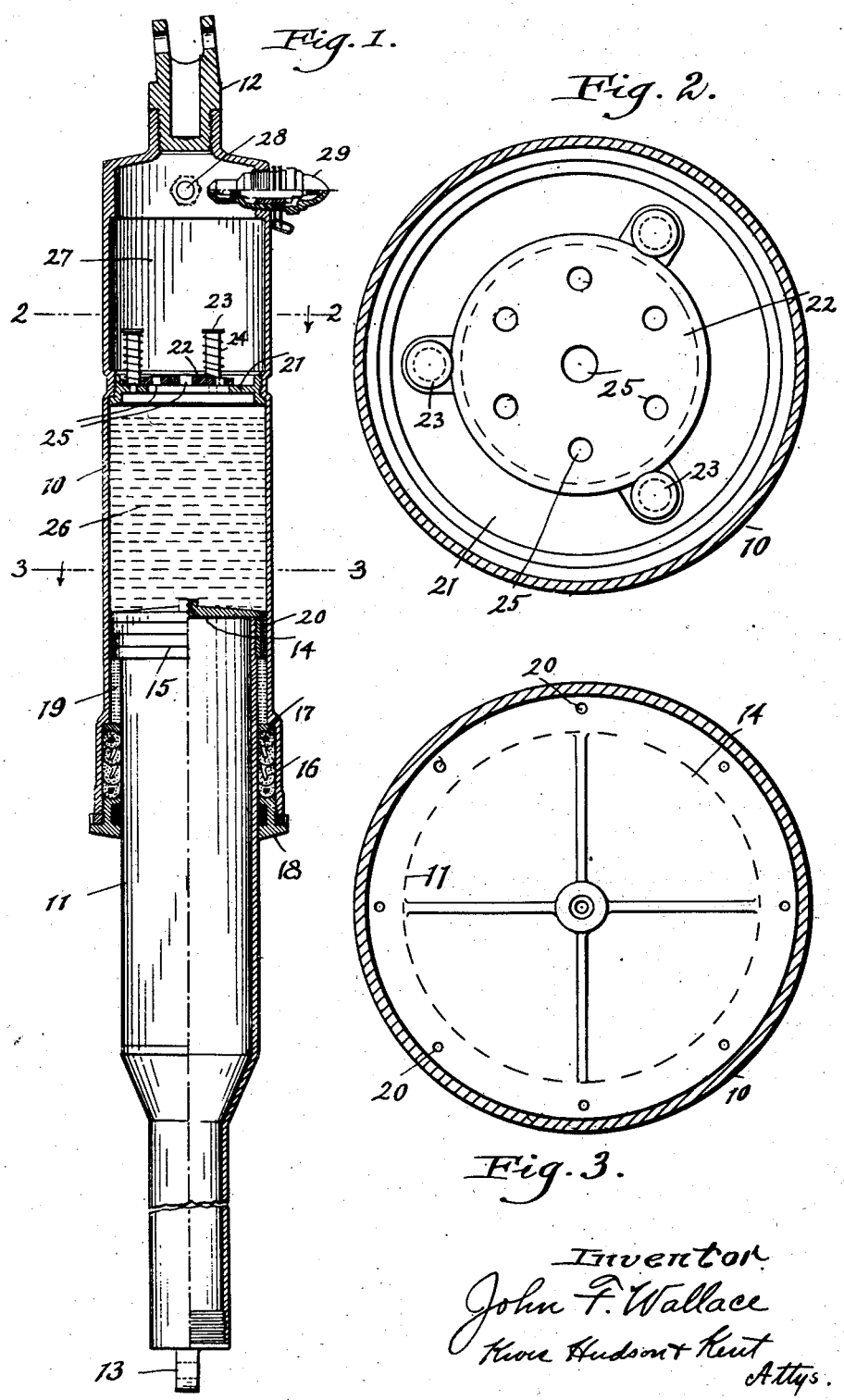

Nov. 22, 1932.   J. F. WALLACE   1,888,578
SHOCK ABSORBING STRUT FOR AEROPLANES
Filed March 30, 1927

Inventor
John F. Wallace
Knox Hudson & Kent
Attys.

Patented Nov. 22, 1932

1,888,578

UNITED STATES PATENT OFFICE

JOHN F. WALLACE, OF SHAKER HEIGHTS, OHIO, ASSIGNOR TO THE CLEVELAND PNEUMATIC TOOL COMPANY, OF CLEVELAND, OHIO, A CORPORATION OF OHIO

SHOCK ABSORBING STRUT FOR AEROPLANES

Application filed March 30, 1927. Serial No. 179,483.

This invention relates to a shock absorbing strut for use in landing gears of aeroplanes. The principal object of the present invention is to provide a strut which is more satisfactory in service than those proposed heretofore.

More particularly, it is the aim of the invention to provide a strut composed of telescopic members having on the interior a chamber in which oil or other non-compressible fluid and compressed air are provided with provision whereby when the impact occurs in landing, a very satisfactory cushioning action is obtained with equally satisfactory provision for preventing sudden rebound. That is to say, the return movement of the telescopic members is retarded so as to be relatively slow as compared with the telescopic movement in the opposite direction.

A further object is to provide a construction wherein there may be a limited relatively free movement of the wheels of the landing gear during the ground service in rising or landing without imparting any material oscillating or bobbing motion to the operator as the wheels pass over uneven ground or come in contact with the ground at successive points.

A still further object is to so construct the strut in the vicinity of the sliding joint between the telescopic members that leakage of oil or of oil and air is prevented, while at the same time there will be no undue friction created by the packing carried by one of the telescopic members on the wall of the other telescopic member at the time of impact and when free telescopic action is desired.

The above and other advantages are attained by my invention which may be here briefly summarized as consisting in certain novel details of construction and combinations and arrangements of parts which will be described in the specification and set forth in the appended claims.

In the accompanying sheet of drawings wherein I have illustrated the preferred embodiment of the invention: Fig. 1 is a longitudinal sectional view of the strut and Figs. 2 and 3 are, respectively, transverse sectional views along the lines 2—2 and 3—3 of Fig. 1.

Referring to the drawing, it will be seen that the strut is composed of two telescopic cylinders 10 and 11, the former being the upper and outer cylinder and the latter the inner and lower cylinder. At the top of the outer cylinder is a fitting 12 and at the bottom of the lower cylinder is a fitting 13 by which the strut may be attached at opposite ends to the plane and landing gear.

At the top of the lower cylinder 11 is a head 14 which closes the upper end of the cylinder and forms a piston which has a close working fit with the inner wall of the upper and outer cylinder 10. This may be formed of a cup-shaped member screwed onto the top of the cylinder 11, the peripheral portion being preferably provided with oil grooves 15, as illustrated.

Adjacent the lower end of cylinder 10, the latter is enlarged somewhat and between the enlargement and the lower cylinder 11, is provided a series of special packing rings 16 which are compressed between an upper annular retainer 17 and a gland nut 18 which is screwed into the lower end of cylinder 10. The packing rings are of a construction such that by pressure between the retainer 17 and nut 18, they tend to expand laterally, the greater the pressure the greater the expansive action and therefore frictional engagement with the wall of the lower cylinder 11.

Ordinarily, the annular shoulder formed by the outer part of the head 14 is seated against the retainer 17. That is to say, this condition exists when the plane is in the air or when the weight of the plane is not on the wheels of the landing gear, but when the plane is resting on the ground, the lower cylinder is moved upwardly somewhat in the upper cylinder forming between the cylinders a chamber 19 to be referred to presently. This chamber communicates with the chamber above the head 14 through a series of ports 20, the function of which will be explained, these ports being formed vertically in the shoulder formed by the outer or peripheral portion of the head.

At a point between the top of cylinder 10 and the lower end thereof and generally somewhat nearer the top, there is partition having a one-way valve formed as follows: There is provided on the inner wall of the cylinder 10 a flanged partition member 21. This member is preferably screwed into a suitably located reduced portion of cylinder 10 which reduced portion is, in this instance, formed by contracting the wall of the cylinder 10, as indicated in Fig. 1. The bottom of this flanged partition member 21 has a laterally projecting flange which bears against the bottom of the reduced part to form a limiting stop.

This flanged partition member has a fairly large central opening which is normally covered by a valve member in the form of a disk 22 adapted to move upward to unseat the valve. This member slides on a series of pins 23 projecting upwardly from the horizontal flange of the partition member 21 and the upward movement is yieldingly resisted by springs 24 surrounding the pins. Generally, three of these pins and springs are sufficient for the purpose. The valve member or disk 22 is preferably provided with a series of ports 25 through which the oil may pass when the valve is seated.

This construction provides between the head 14 and the top of cylinder 10 a chamber, divided into two sections, 26 and 27 the former being below the valve 22 and the latter above the valve. This chamber forms a space of variable volumetric capacity the variation in capacity occurring, of course, on the relative sliding movement of the two cylinders. This chamber is adapted to be filled partly with oil and partly with compressed air and when the strut is fully extended so that the head 14 rests upon the packing retainer 17, the top surface of the oil is preferably somewhat below the partition, including the valve 25, the balance of the chamber being filled with compressed air. Of course the relative volumes of the air and oil may be varied as desired or found necessary. The oil is adapted to be supplied through a suitable opening, normally closed by a plug indicated at 28 and the air is supplied through a valve mechanism, the details of which are immatial to this invention and which is indicated generally by the reference character 29.

In practice, the strut is compressed or shortened its maximum amount, in which event, the top of the head 14 is close to the partition member 21 and then the remaining space in the chamber is completely filled with oil; then the air pressure is applied which distends or elongates the strut and the air is admitted until there is above the oil air at the desired pressure and volume. Assuming that the strut is on an aeroplane resting on the ground and it is desired to charge the same with oil and air, the oil and then the air are admitted, as just stated and when the air pressure in the strut balances the weight of the plane (more accurately, one-half of the weight of the plane since there are two of these struts applied to the landing gear) the strut begins to elongate and when the head is at a predetermined distance from the retainer 17 which is determined by the weight of the plane, the air supply is stopped. Of course, as soon as the plane rises from the ground so that the weight is off the wheels, the strut will elongate further until the bottom of the head engages the packing retainer 17. By this further elongation resulting from the weight of the plane being removed from the struts, the volumetric capacity has, of course, been increased and this reduces the air pressure above the oil.

When the plane is on the ground the two cylinders occupy substantially the position shown in Fig. 1, the body of oil extending from the head 14 to a suitable height in the upper cylinder 10, the top surface of the body of oil being, in this instance, slightly below the transverse partition 21 and valve 22, and between the level of the oil and the top of cylinder 10 is highly compressed air. At this time the head 14 is somewhat above the packing retainer 17 and the chamber 19 is filled with oil which exerts a pressure on the retainer 17 equal to the air pressure in the upper cylinder.

As soon as the plane rises from the ground the strut elongates until the lower part of the peripheral portion of the head engages the packing retainer 17. While this reduces the air pressure, since the size of the chamber above the head 14 has been increased by an amount equal to the lowering of the lower cylinder 11, still the pressure of the oil, by the air pressure above it, over the entire top surface of the head 14 is now transmitted directly onto the packing retainer 17, so that the pressure on the packing is now greatly increased over what it was when the plane was standing on the ground. In other words, when the plane is in the air and the landing gear is idle, a greatly increased pressure is exerted on the packing elements insuring against leakage at the sliding joint even to a greater extent than before.

The lowering of the head 14 and of the lower cylinder 11 has, therefore, resulted in a decrease in the air pressure above the oil but an increased pressure and spreading action on the packing elements. This decreased air pressure is desirable as it allows a more ready yielding and, therefore, a better cushioning action when the wheels of the landing gear engage the ground, and the increased pressure on the packing when the strut is fully elongated gives increased assurance against leakage, as stated above, but as long as this pressure exists the frictional resistance offered by the packing elements to the movement of the lower sleeve is, of course, increased. However, as soon as the wheels engage the ground in landing the initial upward movement of the lower cylinder not only removes the pressure of the head from the packing member 17 but causes a partial vacuum in the space between the head and packing retainer (in the chamber 19) and this instantly reduces to a minimum the pressure of the packing elements on the wall of the lower cylinder. The result is that when the wheels engage the ground either in landing, or if they repeatedly engage the ground before the plane wholly gets off the ground in rising, the condition is such both because of the reduced air pressure in the upper part of the cylinder and the greatly reduced pressure of the packing elements on the lower cylinder immediately after the upper movement of the lower cylinder is initiated, that an excellent cushioning action is obtained.

As the lower cylinder moves upward on the cushioning or compression stroke the oil lifts valve 22 and, therefore, flows freely into the upper section 27 of the oil and air compartment. The compression stroke is cushioned and eventually stopped by the compression of air in the top of cylinder 10 and it is cushioned also by the partial vacuum produced in chamber 19 between the concentric walls of the two cylinders, the upward stroke of the lower cylinder being too rapid and the ports or passages 20 being too restricted to prevent the formation of the partial vacuum in chamber 19 as the lower cylinder moves upward.

At the end of the cushioning or compression stroke the air is very highly compressed in the top of cylinder 10, the amount of compression, of course, depending upon the force with which the wheels of the landing gear engage the ground. Immediately after the cylinders are telescoped in the compression stroke, the movement in the opposite direction starts but this movement compared to the rate of movement in the compression stroke is relatively slow since the valve 22 is now seated and the oil can return to the lower side of the partition through the ports 25 relatively slowly. Additionally the return movement is retarded by reason of the fact that the oil can pass from chamber 19 through ports or passages 20 relatively slowly.

Accordingly, the telescopic movement of the cylinders on the compression stroke can be quick and generally is very sudden with the latter part of the stroke cushioned both by the compression of air at the top of the upper cylinder and by the restricted rate of movement of oil to chamber 19, this last mentioned action releasing the pressure of the packing on the lower cylinder, but the rebound stroke is relatively slow, due principally to the relatively slow return of the oil through the ports of the now closed valve 22, but due also in a measure to the retarded escape of oil from chamber 19 to the space above head 14.

By this construction a strut is provided which is very efficient both in its cushioning action and rebound checking effects. At the same time the sliding joint is protected against leakage both of oil and air. This is quite important in view of the fact that it is highly desirable and in fact necessary that a strut be capable of retaining for a considerable time substantially its initial air pressure. Additionally, the strut is not of complicated construction and can be produced inexpensively compared with many constructions previously proposed.

The upper and lower cylinders are preferably formed as herein illustrated, each from a single tube. The lower end of the upper tube is expanded to accommodate the packing elements, the upper end is upset to form thickened walls to better accommodate the members 28 and 29, and the part which carries the transverse partition 21 is preferably formed by rolling or otherwise forming a groove in the tube to reduce its diameter so that it may be threaded to receive the partition member 21. The lower tube for about one-half its length is of uniform diameter and is then reduced in diameter as illustrated.

However, it is not necessary to adhere to these details and the cylinders may be otherwise formed if desired, although the present construction is preferred from the standpoints of efficiency and relatively low production costs.

Having thus described my invention, what I claim is:

1. A strut for the landing gear of an aeroplane comprising telescopic cylinders forming a continuously closed chamber for noncompressible and compressible fluids, packing means for sealing the sliding joint between the cylinders, and means responsive to telescopic movement of the cylinders for varying the friction exerted by the packing against the relative movement of said cylinders.

2. A strut for the landing gear of an aeroplane comprising telescopic cylinders forming a continuously closed chamber for noncompressible and compressible fluids, packing means for sealing the sliding joint between the cylinders, said packing being carried by one cylinder and engaging the other and means responsive to the elongation of the strut to increase the pressure on the packing and the frictional engagement between it and the last mentioned cylinder.

3. A strut for the landing gear of an aeroplane comprising telescopic cylinders forming a continuously closed chamber for noncompressible and compressible fluids, packing means for sealing the sliding joint between the cylinders, and means responsive to a telescopic movement which shortens the strut to decrease the pressure and frictional engagement of the packing with the last mentioned cylinder.

4. In a shock absorbing strut for aeroplanes, two telescopic cylinders, packing carried by the outer cylinder and engaging the wall of the inner cylinder, said last mentioned cylinder having a head adapted to engage the inner wall of the outer cylinder, said head adapted to exert pressure on the packing for expanding the same laterally when the strut is fully extended.

5. In a shock absorbing strut for aeroplanes, two telescopic cylinders, expansible packing carried by the outer cylinder and engaging the inner cylinder, said last mentioned cylinder having a head adapted to engage the inner wall of the outer cylinder, said head having a packing engaging outer portion adapted to exert pressure on the packing for expanding the same laterally, and having openings for the transmission of oil therethrough.

6. In a strut for aeroplane landing gear, a pair of relatively movable telescoping members, packing between said members, said packing being adapted to expand radially under axial pressure, and means operated by the relative movement of said telescoping members for subjecting said packing to a greater proportion of the fluid pressure within the strut when the telescoping members move in one direction than when they move in the other direction.

7. In a strut for aeroplane landing gear, a pair of relatively movable telescoping members, packing carried by one of said members for engagement with the second of said members to seal the sliding joint therebetween, said packing being adapted to expand radially under axial pressure, and an annular projection on the second of said members for engaging one end of said packing to produce radial expansion thereof as said telescoping members approach the limit of relative movement in one direction.

8. In a strut for aeroplane landing gear, a pair of relatively movable telescoping members, packing carried by one of said members for engagement with the second of said members to seal the sliding joint therebetween, said packing being adapted to expand radially under axial pressure, and an annular projection on the second of said members for engaging one end of said packing to produce radial expansion thereof as said telescoping members approach the limit of relative movement in one direction, said annular projection having openings therethrough for admitting fluid pressure in the strut to the end of said packing.

9. In a fluid strut for aeroplane landing gear, a pair of relatively movable telescoping members adapted to contain fluid for absorbing shocks and checking rebound, expansible packing between said telescoping members, the compression stroke of the strut being adapted to reduce the pressure tending to expand said packing and the expansion stroke of the strut being adapted to increase the pressure tending to expand the packing, whereby the friction of the packing upon one of said telescoping members contributes to the checking of the rebound while leaving the telescoping members relatively free to move in the opposite direction.

10. In a strut for aeroplane landing gear, a pair of relatively movable telescoping members enclosing a chamber of variable size adapted to contain fluid, means for absorbing impact, packing between said members adapted to expand under pressure, and means cooperating with said fluid means for lessening the pressure on said packing during the compression stroke of the telescoping members.

11. In a strut for aeroplane landing gear, a pair of relatively movable telescoping members enclosing a chamber of variable size adapted to contain fluid means for checking the expansion of said telescoping members, packing between said members adapted to expand under pressure, and means cooperating with said fluid means for increasing the pressure on said packing during the expansion stroke of the telescoping members.

12. In a strut for aeroplane landing gear, a pair of relatively movable telescoping members enclosing a chamber of variable size adapted to contain fluid means for absorbing shocks tending to compress said telecoping members and for checking the expansion of the members, packing between said members adapted to expand under pressure, and means cooperating with said fluid means for lessening the pressure on said packing during the compression stroke of the telescoping members and for increasing the pressure on said packing during the expansion stroke of the said telescoping members.

13. A strut for the landing gear of an aeroplane comprising upper and lower telescopic cylinders with a sliding joint between the lower cylinder and the lower end of the upper cylinder including a packing for sealing the sliding joint therebetween said packing being expansible under pressure, the lower cylinder having a head slidingly engaging the inner wall of the upper cylinder there being between the head of the lower cylinder and the top of the upper cylinder a space for non-compressible and compressible fluids with a one-way valve in said space and there being formed between the cylinders an annular variable capacity chamber for the non-compressible fluid with continuously open restricted by-pass openings connecting the same to the first named space.

In testimony whereof, I hereunto affix my signature.

JOHN F. WALLACE.